No. 675,900.  
J. H. McLEAN.  
VEHICLE BODY.  
(Application filed Sept. 16, 1899.)  
Patented June 11, 1901.

(No Model.)  
2 Sheets—Sheet 1.

Witnesses:  
Inventor.  
James H. McLean

No. 675,900. Patented June 11, 1901.
J. H. McLEAN.
VEHICLE BODY.
(Application filed Sept. 16, 1899.)
(No Model.) 2 Sheets—Sheet 2.
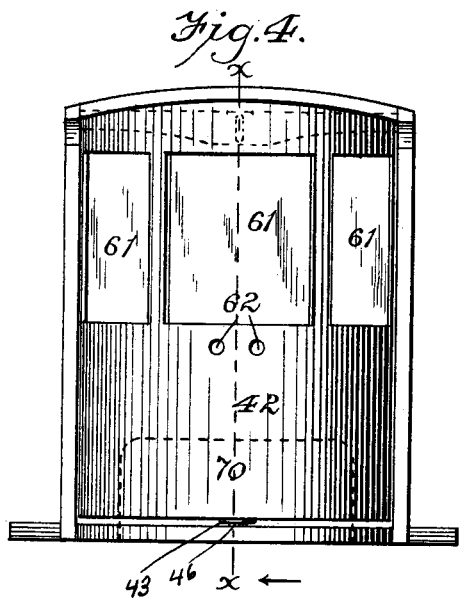
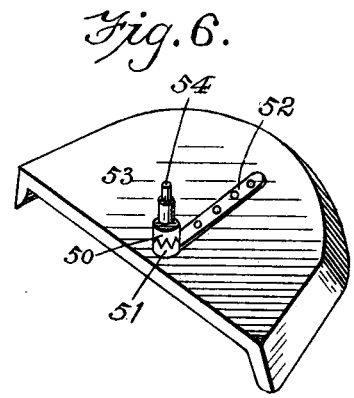
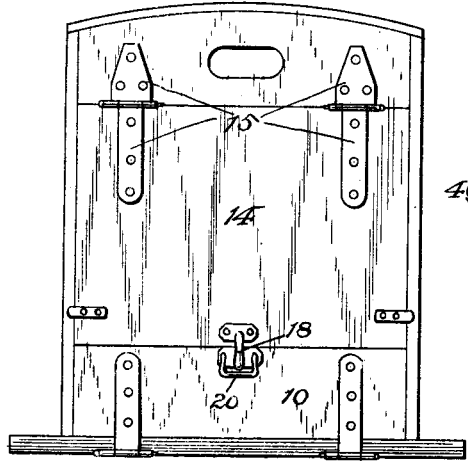
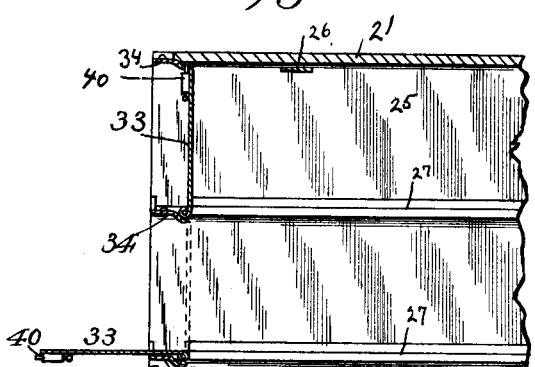
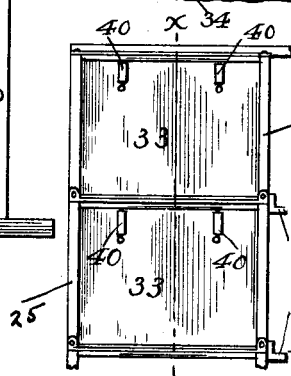
Witnesses:
F. M. Burnham.
S. L. McKee.
Inventor:
James H. McLean
By Male Koehn
Att'y
THE NORRIS PETERS CO., PHOTO-LITHO., WASHINGTON, D. C.

UNITED STATES PATENT OFFICE.

JAMES H. McLEAN, OF DAYTON, OHIO.

VEHICLE-BODY.

SPECIFICATION forming part of Letters Patent No. 675,900, dated June 11, 1901.

Application filed September 16, 1899. Serial No. 730,786. (No model.)

*To all whom it may concern:*

Be it known that I, JAMES H. MCLEAN, of Dayton, county of Montgomery, and State of Ohio, have invented a certain new and useful Improvement in Vehicle Construction; and I do hereby declare that the following is a clear, full, and exact description thereof, reference being had to the accompanying drawings, in which like numerals refer to like parts.
My invention relates to improvements in vehicles, and has for its object the improvement of the construction of the several parts, more particularly of the vestibule, which may in mild weather be moved from in front of the driver to a position behind the driver, screening him, as well as dust, dirt, &c., from the interior of the vehicle-body; furthermore, to an improved end-gate connecting and locking mechanism; furthermore, to a compartment-partition for the body of said vehicle; and my invention furthermore relates to the details of construction, arrangements, combinations, and subcombinations of the various parts, as will be hereinafter described, and stated in the claims.

Figure 1:
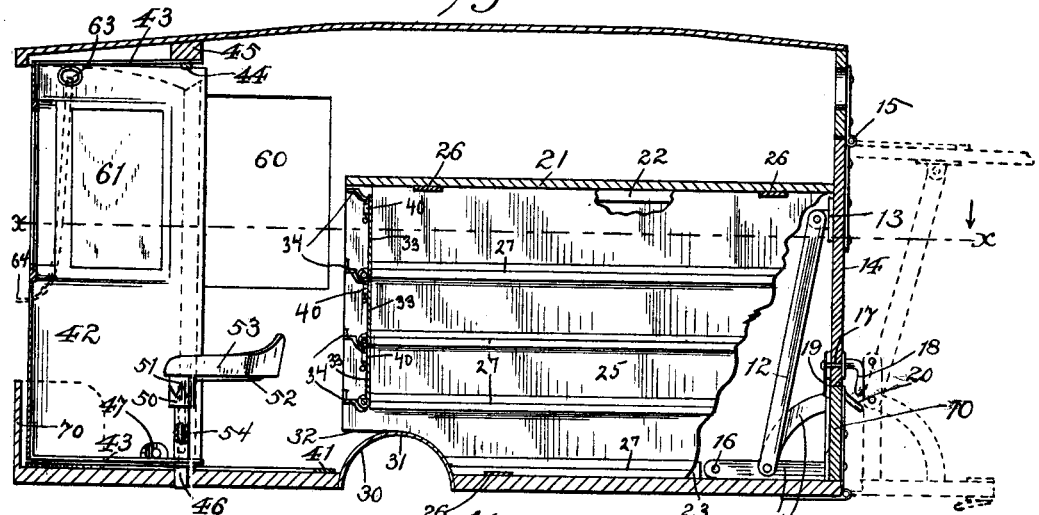
Figure 2:
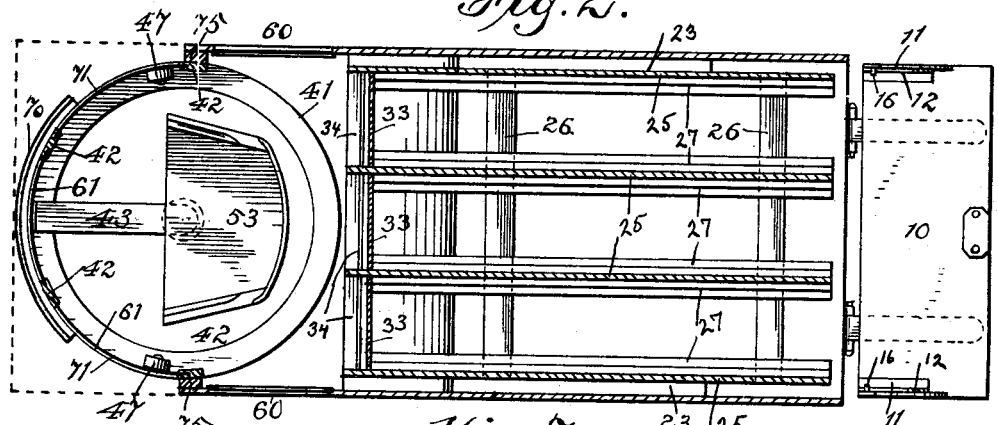
Figure 3:
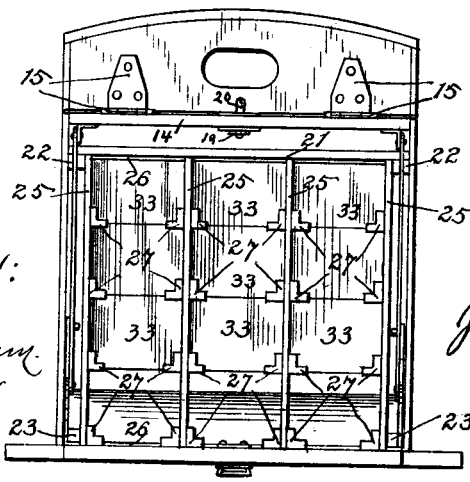

In the drawings, Figure 1 is a sectional side-elevation view taken on line X X of Fig. 4. Fig. 2 is a sectional plan view on line X X of Fig. 1, the end-gate being shown in the open position. Fig. 3 is a rear-elevation view of the vehicle-body with both the end-gates opened. Fig. 4 is a front elevation of the vehicle-body with the vestibule arranged in front of the driver, as shown in Fig. 1. Fig. 5 is a rear-elevation view of a vehicle-body, showing the end-gates closed. Fig. 6 is a bottom perspective view of the driver's seat, showing a portion of its supporting-standard. Fig. 7 is a sectional side-elevation view on line X X of Fig. 8 with the lower door shown open; and Fig. 8 is a front view showing two of the compartments formed by the partitions within the vehicle-body, the adjoining portions of said partitions being broken away.
Hinged to the lower rear end of the vehicle-body is a lower end-gate 10, provided in the instance shown in the drawings with brackets 11, secured to and projecting forwardly from the opposite ends of said end-gate 10. Near the outer ends of said brackets 11 are pivoted connecting-rods 12, pivotally connecting said brackets 11 with brackets 13, secured upon the front face and near opposite ends of an upper end-gate 14, pivoted by hinges 15 or otherwise near the upper rear end of the vehicle-body. Near the outer end of each of said brackets 11 is a lateral projecting pin or lug 16, adapted to contact with said connections 12 when said end-gates 10 and 14 are opened, as shown in dotted lines in Fig. 1, to prevent the lower end-gate 10 from swinging below and out of line with the bottom of the vehicle-body, and at the same time said connection 12 connects both said upper and lower end-gates 14 and 10 in such manner that each supports and retains the other in an open position, while when said end-gates are closed neither can be opened except by swinging the upper end-gate 14 rearward and upward upon its hinges 15.

Through the lower end of the upper end-gate 14 extends a revoluble bolt 17, provided on its outer end with an operating-handle 18 and on its inner end with a latch 19, adapted when turned downward to overlie the upper edge of the lower end-gate 10 to prevent said upper end-gate 14, and consequently said lower end-gate 10, from being opened except when said latch 19 is turned out of engagement with the lower end-gate 10 by said operating-handle 18 to permit the opening of said upper end-gate 14, while for convenience a bail or handle 20 is mounted upon said lower end-gate 10 near its top and projects rearwardly therefrom.

Within the vehicle-body and secured thereto is a horizontal partition 21, near the top thereof, Figs. 1 and 3, having downwardly-projecting cleats 22 near its opposite ends, and at opposite sides of the vehicle-bed and within the vehicle-body are secured cleats 23, Figs. 1, 2, and 3. Between said cleats 22 and 23 and the partition 21 and the vehicle-bed is adapted to be slid for use in hauling numbers of baskets, boxes, or other separate articles a frame formed of a series of upright partitions 25, connected at their tops and bottoms by a series of cross-pieces 26 for rigidly uniting said uprights 25 together. Upon the adjacent faces of said uprights 25 are secured a series of substantially L-shaped portions 27, extending substantially the length of said uprights 25 and adapted to form grooves in which the boxes, baskets, or other separate receptacles are adapted to be supported and slid into and out of said frame.

Near the front end of the vehicle-bed is a semicircular recess 30, adapted to accommodate the front wheels of the vehicle in making short turns, which recess 30 is formed of a substantially semicircular metallic portion 31, which extends above the floor of the vehicle-bed, and a corresponding offset 32, Fig. 1, must be made in the lower front corners of the upright frame portions 25 to accommodate said portion 31, forming said recess 30. At the front end of each of said grooves formed by said members 27, except the lower row of said grooves, is hinged a door 33, Figs. 1, 2, 3, 7, and 8, at a point substantially on a level with the bottom of each of said grooves, so that said doors 33 may be opened outward and downward, as shown at the bottom of Fig. 7, and a lug or cross-strip 34 is mounted at such a point adjacent the hinge of each of said doors 33 as to form a stop for each of said doors when opened to maintain the opened doors in a plane coinciding with the grooves formed by said portions 27, and at the same time said cross-strips 34 are provided with suitable recesses for the reception of one or more spring-bolts 40 at the top of each of said doors 33 to retain said doors 33 in a closed position. The full boxes, baskets, or other receptacles are adapted to be taken out at the rear end of said grooves formed by said portions 27, while said receptacles when emptied are adapted to be replaced in said grooves through their opened doors 33, which replacing of said emptied receptacles moves the remaining filled receptacles nearer to the rear end of said grooves formed by said portions 27, so that they may readily be removed from the rear of the wagon.

The front end of the bed of the vehicle is in the instance shown in Fig. 2 of the drawings formed semicircular, while the top of the roof is formed substantially rectangular at its front end, as shown in dotted lines in Fig. 2. Upon the front end of the bed of the vehicle is mounted a circular track 41, Figs. 1 and 2, in substantially the center of which track 41 is pivotally mounted a vestibule 42, Figs. 1, 2, and 4, by means of one or more arms 43 at its upper and lower ends, respectively, pivoted by means of pin 44, secured in block 45 at the top, and pin 46, rigidly secured in the bed of the vehicle, and said vestibule 42 is provided at its bottom with one or more rollers 47, bearing upon said track 41 and receiving the weight of said vestibule. In the instance shown in Figs. 1 and 6 of the drawings said pin 46 is tubular and is provided at its upper end with an enlarged head 50, provided on its upper face with a series of substantially V-shaped notches adapted to receive the notches of a head 51, secured by arm 52 to the seat 53, said head 51 being provided in its center with a rigidly-secured pin 54, fitting in the bore of the tubular upper end of said pin 46, which enables said seat 53 to be revolved upon a pivot and to be secured at any revoluble position by means of said notches in said heads 50 and 51, and at the same time the arm 52 of said head 51 reinforces or strengthens the bottom of said seat 53. In the sides of the front end of the vehicle-body are preferably glass-covered openings or windows 60, while in said vestibule 42 are a series of preferably glass-covered openings 61, and in the instance shown in Figs. 2 and 4 of the drawings said openings 61 are three in number. At about the center of the front of said vestibule 42 are one or more openings 62 to accommodate the lines, while to the top arm or arms 43 of said vestibule 42 is secured a ring 63, to which the lines 64 (shown in dotted lines in Fig. 1) may be secured.

Upon the front end of the vehicle-bed is a semicircular dashboard 70, Figs. 1 and 2 and Fig. 4 in dotted lines, said dashboard 70 extending over the central portion of the front end of said vehicle-bed to leave passage-ways 71 between the ends of said dash 70 and the body of the vehicle, through which passage-ways 71 the person may enter or leave the vehicle when the vestibule 42 is turned slightly in either direction upon its pivots 44 and 46 and its rollers 47 upon track 41.

During clement weather or at any desirable time the vestibule 42 may be turned from in front of the seat 53 to a position behind said seat, and thus instead of screening the driver from the weather it exposes the driver thereto and screens the interior of the vehicle-body therefrom.

Upon opposite sides of the front end of the vehicle-body are vertical strips 75, extending adjacent to the exterior surface of the semicircular vestibule 42 and are adapted to form substantially a water-tight joint between the sides of the vehicle-body and said vestibule.

Having now described my invention, what I claim, and desire to secure by Letters Patent, is—

1. The combination of a vehicle-body provided with upper and lower hinged end-gates, brackets attached to said gates, a connection extending between and pivotally connected to said brackets, and a limit-stop between one of said brackets and said connection, substantially as specified.

2. The combination with the vehicle-body, of the upper and lower hinged end-gates, brackets secured at opposite sides of each of said gates, a connection extending between and pivoted to the brackets at each side of said end-gates, and a limit-stop between one bracket on each side and said connection on each side, substantially as specified.

3. The combination of a vehicle-body, a revoluble semicircular vestibule pivotally mounted at the front end thereof, one or more sight-openings through said vestibule, and a seat mounted substantially in the center of said semicircular revoluble vestibule, whereby said vestibule may be turned in front of said seat to screen the occupant and the interior of the vehicle-body from the weather, and whereby said vestibule may be turned to separate the seat and its occupant from the interior of the vehicle-body and screen only the interior of the vehicle-body from the weather, substantially as specified.

4. The combination of a vehicle-body having a bed, sides and a top, a revoluble semicircular vestibule extending vertically between the bed and top, the height and diameter of said vestibule being substantially equal to the distance between the bed and the top and between the two sides respectively, said vestibule being mounted upon rollers and a circular track, substantially as specified.

5. The combination of a vehicle-body having a bed, sides and a top, a revoluble semicircular vestibule extending vertically between the bed and top, the height and diameter of said vestibule being substantially equal to the distance between the bed and the top and between the two sides respectively, said vestibule being mounted upon rollers and a circular track, and said vestibule being provided at its top and bottom with extensions projecting toward the axis of said vestibule at which points said extensions are provided with pivotal bearings in the vehicle bed and top, substantially as specified.

6. The combination of a vehicle-body having a bed, sides and a top, a revoluble semicircular vestibule extending vertically between the bed and top, the height and diameter of said vestibule being substantially equal to the distance between the bed and the top and between the two sides respectively, said vestibule being mounted upon rollers and a circular track, and said vestibule being provided at its top and bottom with extensions projecting toward the axis of said vestibule at which points said extensions are provided with pivotal bearings in the vehicle bed and top, one or more openings through said vestibule to accommodate the lines, and means carried by said extensions at the upper end of said vestibule for securing the ends of the lines thereto, substantially as specified.

7. The combination of a vehicle-body, of a removable receptacle-frame therein formed of a series of uprights provided with a series of grooves to receive and support receptacles, said grooves being formed of projecting strips upon said uprights cross-pieces for securing said uprights together, doors mounted in the front ends of a series of grooves, and means for securing said doors when closed, substantially as specified.

8. The combination of a vehicle-body, of a removable receptacle-frame therefor formed of a series of vertical and horizontal portions, and a series of slides for centering said receptacle-frame in said vehicle-body, substantially as specified.

In witness whereof I have hereunto set my hand this 3d day of July, 1899.

JAMES II. McLEAN.

Witnesses:
IRA C. KOEHNE,
F. M. BURNHAM.